United States Patent
Ulenas (10) Patent No.: US 7,299,309 B2
(45) Date of Patent: Nov. 20, 2007

(54) METHOD AND APPARATUS FOR PROTOCOL AND CODE CONVERTER

(75) Inventor: Jonas Ulenas, Dix Hills, NY (US)

(73) Assignee: Vetra Systems Corporation, Hauppauge, NY (US)

( * ) Notice: Subject to any disclaimer, the term of this patent is extended or adjusted under 35 U.S.C. 154(b) by 0 days.

(21) Appl. No.: 11/399,791

(22) Filed: Apr. 5, 2006

(65) Prior Publication Data

US 2007/0016705 A1    Jan. 18, 2007

Related U.S. Application Data

(60) Provisional application No. 60/699,418, filed on Jul. 14, 2005.

(51) Int. Cl.
*G06F 13/10* (2006.01)
*G06F 3/023* (2006.01)
*H03K 17/94* (2006.01)

(52) U.S. Cl. ............................ 710/67; 710/62; 710/65; 341/22; 345/168

(58) Field of Classification Search ...................... None
See application file for complete search history.

(56) References Cited

U.S. PATENT DOCUMENTS

| | | | |
|---|---|---|---|
| 6,363,085 B1 | 3/2002 | Samuels | |
| 6,381,666 B1 | 4/2002 | Kejser et al. | |
| 6,571,305 B1 | 5/2003 | Engler | |
| 6,708,247 B1 | 3/2004 | Barret et al. | |
| 6,922,748 B2 | 7/2005 | Engler | |
| 6,934,793 B2 | 8/2005 | Ying et al. | |
| 6,954,808 B2 | 10/2005 | Russell | |
| 6,961,798 B2 | 11/2005 | Ferguson | |
| 2004/0080437 A1* | 4/2004 | Lin | ............................ 341/26 |
| 2004/0088453 A1* | 5/2004 | Rothman et al. | ............. 710/67 |
| 2004/0103235 A1* | 5/2004 | Liu | ............................ 710/313 |
| 2004/0210692 A1* | 10/2004 | Rothman et al. | ............. 710/74 |
| 2005/0083318 A1* | 4/2005 | Rix et al. | .................... 345/179 |
| 2006/0028433 A1* | 2/2006 | Myrick | ........................ 345/156 |
| 2006/0117936 A1* | 6/2006 | Szolyga | ........................ 84/603 |

OTHER PUBLICATIONS

Vetra Systems Corporation, "User Instructions for the VIP-335 "SmartPipe"™ Protocol Converter".
Vetra Systems Corporation,"Vetra Systems manufactures a complete line of KVM products and solutions," www.vetra.com/335text.htm/.

* cited by examiner

*Primary Examiner*—Ilwoo Park
(74) *Attorney, Agent, or Firm*—Fulbright & Jaworski LLP (57) ABSTRACT

Apparatus and method for converting protocol and code for use with a Human Interface Device (HID)-compliant keyboard device comprises a Universal Serial Bus (USB) interface, non-USB interface and a converter. The USB interface receives standard USB data from an USB host or hub and provides responses required by an USB Specification for the HID-compliant keyboard device. The non-USB interface can receive data coded in American Standard Character Interchange Interface (ASCII) or Unicode. The converter converts the data coded in ASCII or Unicode into code and format in accordance with the USB Specification for the HID-compliant keyboard device.

11 Claims, 5 Drawing Sheets

METHOD AND APPARATUS FOR PROTOCOL AND CODE CONVERTER

REPLATED APPLICATIONS

The present application claims benefit of U.S. Provisional Application No. 60/699,418 filed Jul. 14, 2005, which is incorporated by reference in its entirety.

BACKGROUND OF THE INVENTION

There are many applications where alphabetic data needs to be entered into a computer or computing system or apparatus. Such data, representing the written alphabet of a language, is usually represented in a digitally encoded format. Very often the data is coded in the American Standard Character Interchange Interface (ASCII) coding standard, the ANSI X3.4-1986 standard. Internationally, this standard is known as ISO/IEC 646:1991. Another coding standard used to represent alphabetic characters is the Unicode standard. In Unicode, each character is represented by two bytes, instead of one byte used in ASCII. The Unicode Consortium first published the Unicode standard in 1991 as "The Unicode Standard" (ISBN 0321185781). The latest revision is 4.1. Unicode shares its character repertoire with ISO/IEC 10646.

A common and convenient method to enter alphabetic data into a computer or computing apparatus is via the keyboard input. Many application programs available on the market expect data entry via the keyboard. However, the computer keyboard key codes used to represent keyboard characters are quite different from ASCII or Unicode codes. To modify such application programs to accept ASCII or Unicode format data from other input ports available on standard computers, such as the serial RS-232 ports, commonly known as COM ports, or the parallel port intended for printer use, commonly known as the LPT port, is complicated and expensive.

Therefore, it would be useful to have means to convert ASCII or Unicode data into the electrical and logical format used by the keyboard of a computer. There are two PC computer keyboard standards in wide use today. One is the PS/2 keyboard standard. A more recent standard is the Universal Serial Bus (USB) Human Interface Device (HID) keyboard standard, which is replacing the PS/2 standard.

A device to translate ASCII coded data into the PC PS/2 keyboard standard, model VIP-335, is available from Vetra Systems Corporation. This device cannot be used on an USB port of a computer, however, only on the PS/2 port specifically dedicated to keyboard input. The PS/2 keyboard electrical interface, the codes representing keys and keyboard command protocol are radically different from the USB protocol and its instantiation for keyboard data. For instance, the PS/2 keyboard protocol has a unique code for the release of a keyboard key, while the USB standard does not and uses a significantly different method to indicate keyboard key release. Key information is sent by the PS/2 keyboard to the PC only when a key is activated or released. Every PS/2 keyboard data message is limited to information about one key, reporting either its depression or release. In the USB standard, the computer interrogates the keyboard for data every 10 milliseconds. The USB keyboard message can report the depression or release of up to 14 keys every 10 milliseconds.

The USB ports available on new computers are universal. That is, they are not dedicated to any one device, and can accept many devices. When a device is plugged in to such a port, the computer starts a process called "enumeration" by which the computer finds out what type of device has just been plugged in. For a keyboard to be recognized as such, it must provide appropriate responses and information to the requests from the computer during the enumeration process.

The complexity of USB keyboard key encoding, the electrical signaling methods, and the USB protocol requirements for a keyboard device are such that it is not possible simply to modify a device intended for connection to a PS/2 keyboard input. A radically different approach is necessary.

The present invention overcomes these problems by providing a method and apparatus to accept data encoded according to the ASCII, Unicode, or other coding standards and converting such data into keyboard codes in accordance with USB Human Interface Device (HID) keyboard standards. It also allows extension of the incoming coding to represent keys of the standard PC keyboard that may be needed in some applications, such as providing test scripts, and that are not part of the ASCII or Unicode standards. One example of such keys are the left and right Control keys, the arrow keys, left, right, up, down, the position control keys (Home, End, for instance), and the functions keys, usually labeled F1-F12, or even higher, which are found on standard and common keyboards used with many computers.

OBJECTS AND SUMMARY OF THE INVENTION

It is an object of the present invention to provide an apparatus and technique capable of converting data encoded in ASCII, Unicode, or some other standard, to data in the format and electrical protocol in accordance with the USB standard for a keyboard.

Another object of the present invention is to provide a system and technique for simulating, in the format and electrical protocol in accordance with the USB standard for a keyboard, standard PC keyboard keys that are not defined in the ASCII or Unicode coding standards.

Still another object of the present invention is to provide a system and technique for generating in the format and electrical protocol in accordance with the USB standard for a keyboard only a PC keyboard key closure (make) or only a PC keyboard key opening (break).

Yet another object of the present invention is to provide a system and technique for maximum data rate while converting incoming data into USB keyboard protocol.

Further object of the present invention is that no hardware or software changes need to be made to the existing computers, software, USB hubs, and devices in the system.

In accordance with an embodiment of the present invention, apparatus for converting protocol and code for use with a Human Interface Device (HID)-compliant keyboard device comprises a Universal Serial Bus (USB) interface, non-USB interface and a converter. The USB interface receives standard USB data from an USB host or hub and provides responses required by an USB Specification for the HID-compliant keyboard device. The non-USB interface can receive data coded in American Standard Character Interchange Interface (ASCII) or Unicode. The converter converts the data coded in ASCII or Unicode into code and format in accordance with the USB Specification for the HID-compliant keyboard device.

In accordance with an embodiment of the present invention, a method for converting protocol and code for use with a Human Interface Device (HID)-compliant keyboard device comprises the steps of receiving standard USB data, receiving data coded in ASCII or Unicode and converting the data coded in ASCII or Unicode. The present method provides responses required by an USB Specification for HID-compliant keyboard device when it receives standard USB data from an USB host or hub. When non-USB data (e.g., data coded in ASCII or Unicode) is received, the ASCII or Unicode coded data is converted into code and format in accordance with the USB Specification for the HID-compliant keyboard device.

In accordance with an embodiment of the present invention, the apparatus comprises a programmed microprocessor or other digital processing engine, coupled to an input interface circuit, an USB serial interface engine (SIE), and an optional output interface circuit. The SIE decodes messages and data on the USB, accepts those addressed to it, and sends messages and data in the appropriate USB format. The microprocessor is programmed to control the SIE to provide enumeration responses identifying the device as a keyboard, to accept commands and data, and to respond to messages requesting keyboard data with translated ASCII, Unicode or other format data, if any has been received. The microprocessor is further programmed to comprise tables and processing logic guiding the translation of incoming codes to USB keyboard codes. The microprocessor further comprises buffers to accumulate incoming data to be translated, to hold messages from the SIE for analysis to determine the required response, and to format and hold outgoing USB keyboard messages. The optional output circuit can provide signals to the source of incoming data that may be required for proper communications in given instances. An optional USB hub can be used to provide inputs for additional USB devices. The hub is placed between the SIE and the upstream connection to an USB host.

In accordance with an embodiment of the present invention, the apparatus comprises a programmed microprocessor with associated input/output circuitry. It is appreciated to one of ordinary skill in the art that any apparatus can be used that can interpret translation tables and instructions for data handling in accordance with specified logic and algorithms.

An example of a microprocessor that also incorporates an USB Serial Interface Engine supporting all three USB speeds, low-, full- and high-speed is the EZ-USB FX2LP™ available from Cypress Semiconductor Corporation. An example of a microprocessor that also incorporates an USB Serial Interface Engine supporting two USB speeds, low- and full-speed, is the AT89C5130A-M available from Atmel Corporation. An example of an USB hub is the AT43301-SC available from Atmel Corporation.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENTS

In the following detailed description of various embodiments of the present invention, reference is made to the accompanying drawings, which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to communicate with others skilled in the art. An algorithm is generally taken to be a self-consistent sequence of steps leading to a desired result. Unless specifically stated otherwise terms, such as "processing," "computing," "calculating," "determining," "displaying" or the like, refer to the action and processes of a computer system, that manipulates and transforms data represented as physical (e.g., electronic) quantities within the computer system's registers and memories into other data similarly represented as physical quantities within the computer system memories or registers or other such information storage, transmission or display devices. A "computer system" as used herein is taken to represent a digital processing engine, microprocessor or similar computing device. In addition, as used herein a "computing device" includes one or more processing elements coupled with computer readable memory. The memory can be volatile or non-volatile memory or any combination thereof.

Figure 1:
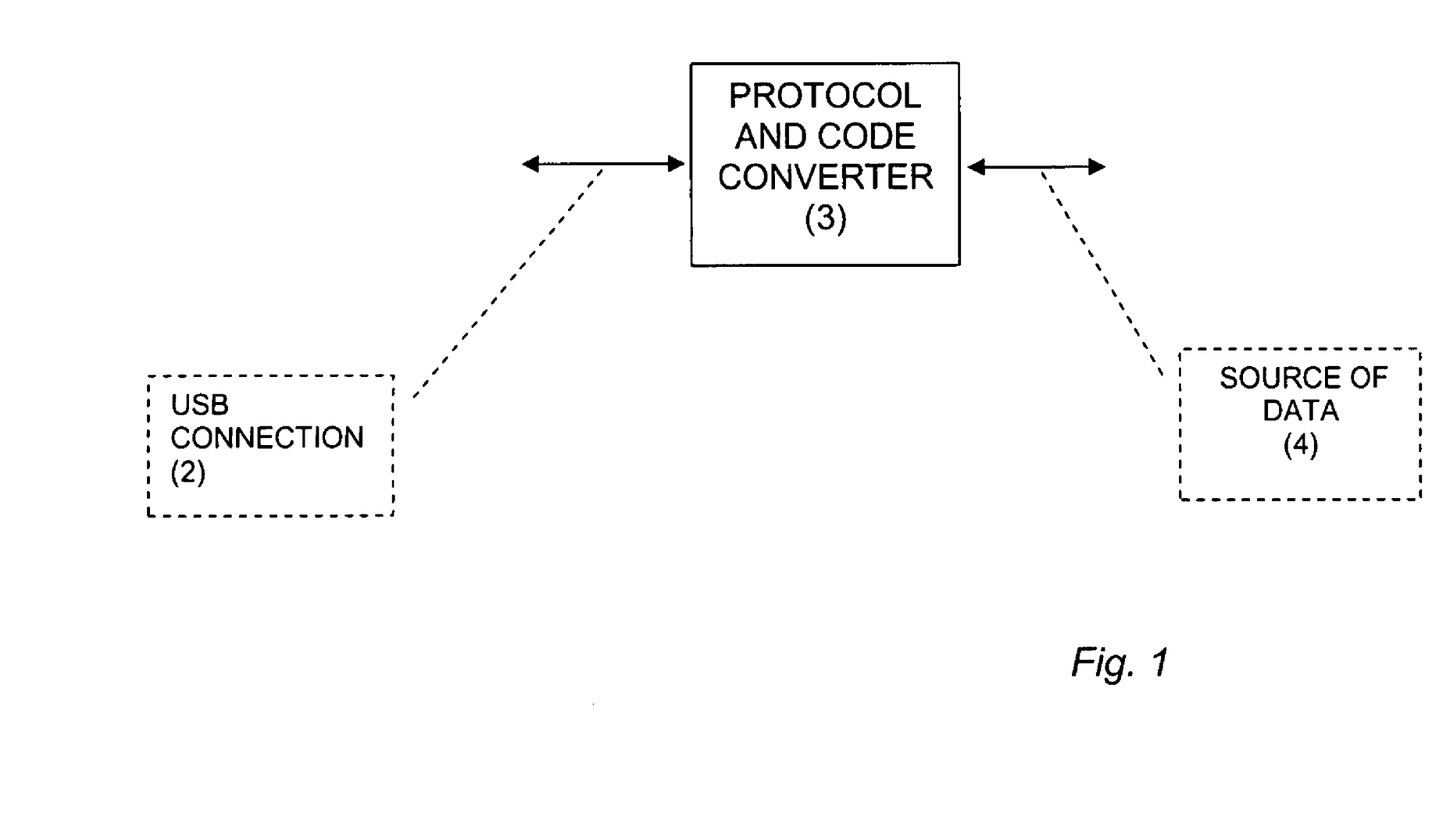
FIG. 1 is a block diagram of the system application in accordance with an embodiment of the present invention.

In accordance with an embodiment of the present invention, FIG. 1 shows a block diagram of a system comprising a Protocol and Code Converter (3). The Converter (3) accepts data coded in accordance with the ASCII or Unicode standards, or data coded according to another standard, from an external source (4) of such data. The Converter (3) translates and converts the incoming data to data encoded and formatted in accordance with the USB 2.0 Specification and in accordance with the Device Class Definition for Human Interface Devices (HID) Version 1.1 for keyboard device and presents the converted data on the USB Connection (2). The converted data is presented to a target for USB keyboard data, which can be a computer or an USB hub, or any device capable of accepting keyboard data in accordance with USB 2.0 and the HID specification. In addition, the Converter (3) responds to enumeration and other standard requests that the USB target (not shown) presents to the Converter (3). Neither the target for USB keyboard data nor the source (4) of data are part of the present invention and are shown strictly for the purposes of illustrating an exemplary application of the present invention.

Figure 2:
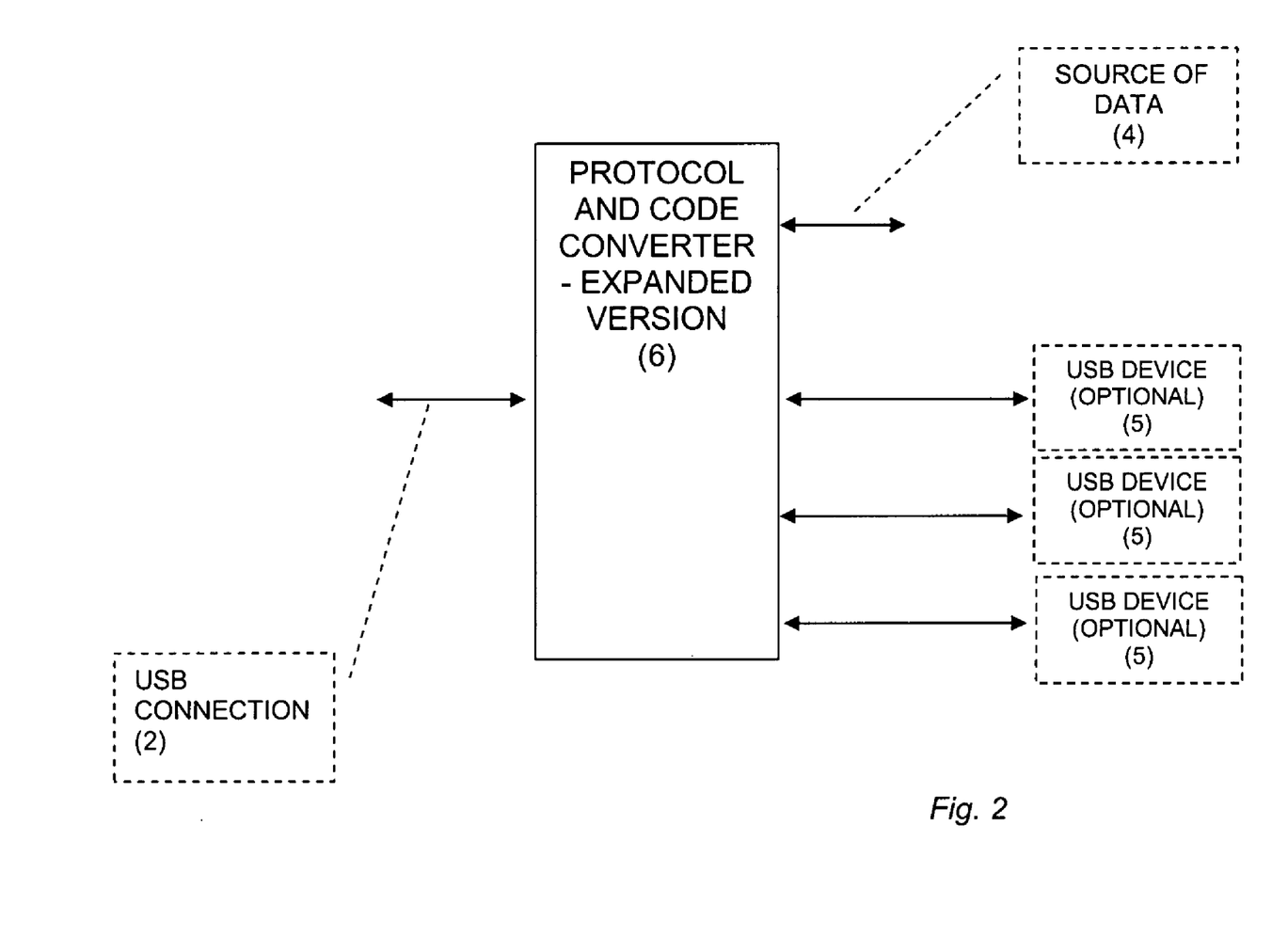
FIG. 2 is a block diagram of the system application of an expanded version in accordance with an embodiment of the present invention.

In accordance with an embodiment of the present invention, FIG. 2 shows a block diagram of a system comprising an expanded version of the Protocol and Code Converter (6) or the Expanded Version (6). The Expanded Version (6) of the Converter performs all the functions of the Converter (3) with respect to incoming data conversion and interface with the USB keyboard data target. In addition, the Expanded Version (6) provides three additional USB inputs (downstream ports) into which up to three optional USB devices can be plugged in providing convenience to a user of the present invention. These USB devices appear on the USB Connection (2) connected to the USB target via an USB hub. As noted herein, neither the target for USB keyboard data nor the source (4) of data are part of the present invention and are shown strictly for the purposes of illustrating an exemplary application of the present invention. It will be understood by one skilled in the art that the number of additional USB device inputs can be more or less than those shown in FIG. 2. The operation of the Digital Processing Engine (310) in accordance with an embodiment of the present invention shown in FIG. 4 for the Expanded Version (6) of the Protocol and Code Converter of FIG. 2 is substantially similar to the operation of the Digital Processing Engine (310) in accordance with an embodiment of the present invention shown in FIG. 3 and described herein for the Protocol and Code Converter of FIG. 1.

Figure 3:
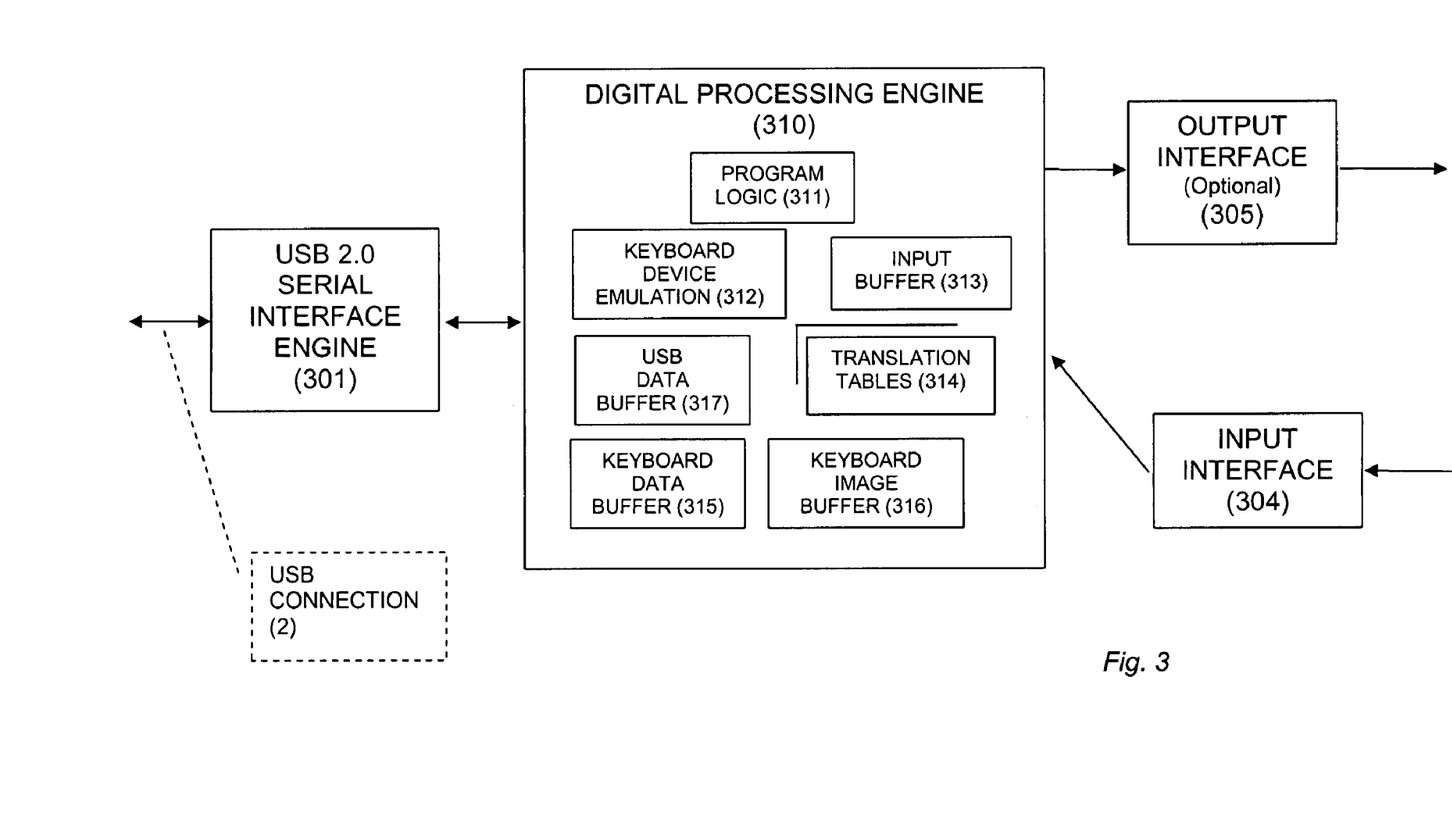
FIG. 3 is a block diagram of the Protocol and Code Converter in accordance with an embodiment of the present invention.
Figure 4:
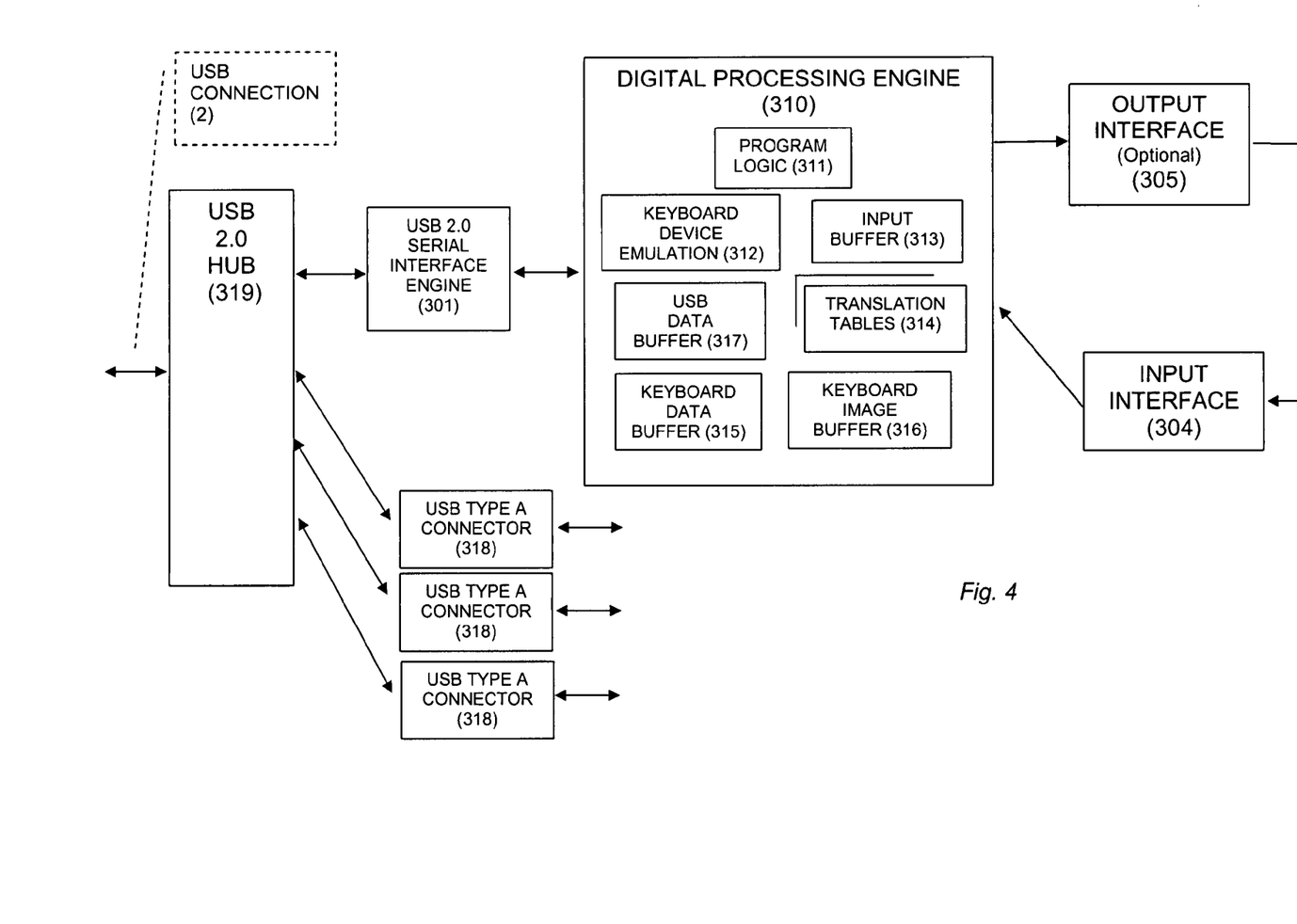
FIG. 4 is a block diagram of an expanded version of the Protocol and Code Converter in accordance with an embodiment of the present invention.

In FIG. 3, the Converter (3) or the Expanded Converter (6) detects that it has been connected to the USB by either drawing power from the USB or by monitoring the USB voltage. Operation of the Converter (3) or the Expanded Converter (6) starts at this point, after a delay to allow power to settle. At the same time, the USB speed-indicating resistors, part of the USB 2.0 Serial Interface Engine (SIE) (301), signal the USB host that a device has been attached. The SIE (301) interfaces to the USB. It decodes the signals on the USB from the USB format into a format used by the Digital Processing Engine (310) providing decoded USB signals and commands to the Keyboard Device Emulation (312). When data needs to be transmitted to the USB, the SIE (301) accepts binary data from Keyboard Device Emulation (312) and encodes it in the signaling format used by the USB. When operation of the Converter (3) or Expanded Converter (6) starts, Keyboard Device Emulation (312) waits for the USB Reset signal as decoded by the SIE (301). Processing after detecting the reset depends on the speed of the Converter (3) or Expanded Converter (6). If the Converter (3) or Expanded Converter (6) is to operate at high speed, Keyboard Device Emulation (312) initiates the dialog with the USB host defined in the USB Specification paragraphs 7.1.5 and 7.1.7. If the Converter (3) or Expanded Converter (6) is to operate at low or full speed, Keyboard Device Emulation (312) waits for completion of an USB reset. After completion of the high-speed dialog or at the end of USB reset Keyboard Device Emulation (312) will respond to USB commands directed to device address 0. As part of the enumeration dialog that the USB host conducts with a newly attached device, it issues a "Set Address" command assigning a unique address in the range from 1 through 127 to the device. Keyboard Device Emulation (312) stores the new device address and conditions the SIE to respond only to USB requests directed to the new address. This address is kept until the Converter (3) or (6) is unplugged from the USB or the USB host issues another USB reset or "Set Address" command. Keyboard Device Emulation (312) responds to all standard device requests as defined in section 9.4 of the Universal Bus Specification, Revision 2.0. In addition, Keyboard Device Emulation (312) responds to the additional requests and reports that a keyboard must support as defined in Section 6.2, Class-Specific Descriptors, of Universal Serial Bus Device Class Definition for Human Interface Devices (HID) Version 1.1, or any future revisions.

Keyboard Device Emulation (312) notifies Program Logic (311) when the Set Configuration command has been received. After the "Set Configuration" command, the Converter (3) or (6) is ready to perform its functions. The Converter (3) or (6) will start looking for input data at the Input Interface (304), translate it to USB keyboard key codes and make it ready for transmittal to the USB host. When the USB host is ready for keyboard data it starts sending periodic "IN" requests, which are processed by the Keyboard Device Emulation (312). Keyboard Device Emulation (312), in cooperation with Program Logic (311), sends any keyboard data that is ready to the USB host. If no data is ready, Keyboard Device Emulation (312) returns a "NAK" handshake response to the USB host indicating that it does not have any data.

Keyboard Emulation (312) also monitors USB activity by detecting the "Start Of Frame" (SOF) packets or the low speed keep-alive "End-Of-Packet" (EOP) signaling sent every millisecond by the USB host. If there is no USB activity, as indicated by the absence of the SOF's or EOP's for longer than 3 milliseconds, Keyboard Device Emulation (312) indicates to the Program Logic (311) that USB is inactive. Program Logic (311) causes the Converter (3) or (6) to enter the "Suspended" state. In the Suspended state, the Converter (3) or (6) draws no more than suspend current specified in the USB specification. When USB activity resumes, Program Logic (311) causes the Converter (3) or Converter (6) to exit Suspended state and to resume normal operation. Optionally, the Converter (3) or Expanded Converter (6) recognizes signal activity at the Input Interface (304) and issues "resume" signaling to the USB via the SIE (301).

After receiving the "Set Configuration" command from the USB, incoming data coded in accordance with the ASCII or Unicode standards, or according to another standard, is accepted from an external source (4) of such data by the Input Interface (304). The Input Interface (304) converts the incoming data from its electrical and encoding format into a format used by the Digital Processing Engine (310). The incoming data can be in a serial format such as RS-232, Ethernet or RS-485, or it can be in a parallel format, or a combination. The communication medium can be wire, infra-red, radio or fiber optic links, or any other comparable medium. When incoming data has been received and converted to a format used by the Digital Processing Engine (310), the Input Interface (304) places the data in the Input Buffer (313) and signals the Digital Processing Engine (310) that data is ready. Program Logic (311) starts the translation process. Program Logic (311) is also optionally responsible to cause the generation of any required output handshake or coordination signals, such as data accepted or clear-to-send signals. Such signals are converted into a format used by the external source of data (4) by the optional Output Interface (305).

Program Logic (311) translates data in the Input Buffer (313) using Translation Tables (314). Each incoming code has an entry in the Translation Tables (314) that is the corresponding USB keyboard code. For instance, lower case 'a' is the decimal number 97 in the ASCII encoding standard. It is translated to the decimal number 4, representing the 'a' key in the USB keyboard standard. In addition, each incoming code has an entry in the Translation Tables (314) that indicates if the code needs another key to be held down simultaneously to be properly represented. For example, upper case 'A' is the decimal number 65 in the ASCII encoding standard. It is also translated to the decimal number 4, representing the 'a' key in the USB keyboard standard. In addition, the bit in the modifier byte in the USB keyboard message indicating that a Shift key is down (bit 1 for Left Shift key down) is set. Many non-US (international) keyboards require that the Right Alt key of the standard PC keyboard, in this instance known as the Alt Gr Key key, be held down together with another key properly to represent international characters. The Translation Tables (314) can contain other information concerning each particular incoming code. If the incoming data has capabilities beyond those inherent in the coding standard of the incoming data, such as indications that the translated key should be held down until released, the Translation Tables (314) will have appropriate entries. The ability to encode key make, and subsequent release, in the incoming data is particularly useful if key chords need to be generated. Many computer applications require that a modifier or control key be held simultaneously with another key. An example is the standard Microsoft Windows key command to close a program, namely the Alt key held down together with the F4 key.

After getting the USB keyboard key code and any special requirements, such as the need for the any modifier key codes, Program Logic (311) checks the Keyboard Data Buffer (315) and the Keyboard Image Buffer (316) to see if the USB key code is already present in the buffer, and if the modifier key codes match the modifier key requirements of the code being translated. If the modifier key codes in the Keyboard Data Buffer (315) do not match the requirements of the code being translated or the key code is already present in the Keyboard Data Buffer (315) or in the Keyboard Image Buffer (316), the contents of the Keyboard Data Buffer (315) are transferred to the USB Data Buffer (317) if the USB Data Buffer is empty. If not, the Program Logic (311) waits until the USB Data Buffer (317) becomes empty. The USB Data Buffer (317) becomes empty when the USB host issues an "IN" command, normally every 10 milliseconds for keyboard data and slower for other data that may represent other keys, such as power on/off or multimedia controls such as volume, that can be included in the incoming data at the Input Interface (304). When the data in the USB Data Buffer (317) has been transferred to the USB and an ACK handshake packet has been received from the USB host, the USB Data Buffer (317) becomes empty. If Program Logic (317) was waiting for this event, it will copy the contents of the Keyboard Data Buffer (315) to the USB Data Buffer (317). At the same time, the contents of the Keyboard Data Buffer (315) are copied to the Keyboard Image Buffer (316) and the Keyboard Data Buffer (315) is cleared. The Keyboard Image Buffer (316) is provided to prevent disturbing the contents of the USB Data Buffer (317). The Keyboard Image Buffer (316) is needed only if the USB Data Buffer (317) would be disturbed by reading its contents while it is ready to be transmitted, or while being transmitted, to the USB by Keyboard Emulation (312) and the SIE (301).

When the Program Logic (311) finds the Input Buffer (313) empty, it checks the Keyboard Data Buffer (315) to see if it contains any data. If it does, the contents of the Keyboard Data Buffer (315) are transferred to the USB Data Buffer (317) if the USB Data Buffer is empty. If not, the Program Logic (311) waits until the USB Data Buffer (317) becomes empty. The USB Data Buffer (317) becomes empty when the USB host issues an "IN" command, normally every 10 milliseconds. When the data in the USB Data Buffer (317) has been transferred to the USB and an "ACK" handshake packet has been received from the USB host, the USB Data Buffer (317) becomes empty. Program Logic (311) will copy the contents of the Keyboard Data Buffer (315) to the USB Data Buffer (317). At the same time, the contents of the Keyboard Data Buffer (315) are copied to the Keyboard Image Buffer (316), and the Keyboard Data Buffer (315) is cleared. If the Keyboard Data Buffer (315) does not contain any data, and if an empty Keyboard Data Buffer (315) has not been sent to the USB, the Program Logic (311) sends the empty Keyboard Data Buffer (315) to the USB by the same process as described above, and marks that an empty Keyboard Data Buffer (315) has been sent to the USB. The next time a Keyboard Data Buffer (315) with data is sent to the USB, the mark that an empty buffer has been sent is cleared by the Program Logic (311).

Figure 5:
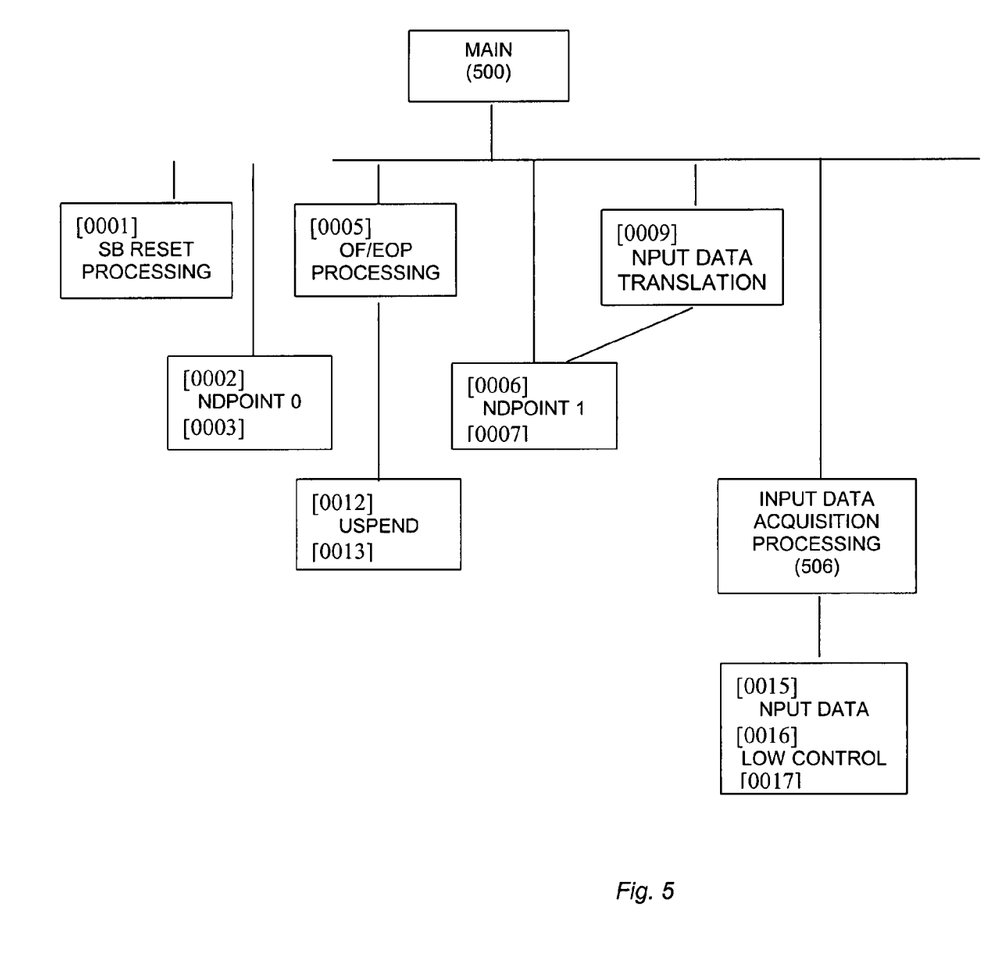
FIG. 5 is a structure diagram of the Protocol and Code Converter in accordance with an embodiment of the present invention.

Turning now to FIG. 5, there is illustrated a the structure of the software in accordance with an embodiment of the present invention. The Main program (500) controls the overall operation and sequences through the other processes. After powering up, the system waits for an USB reset. When the USB reset is completed for USB low- and full-speed systems, the system sets its USB address to 0, and is ready to accept USB packets directed to USB address 0 and endpoint 0, SOF packets or EOP signaling. If the system is an USB high-speed, when the reset is detected the USB reset processing (501) initiates a dialog with the USB host defined in the USB Specification paragraphs 7.1.5 and 7.1.7. After the high-speed dialog is complete, the system sets its USB address to 0, and is ready to accept USB packets directed to USB address 0 and endpoint 0 or SOF packets. When a packet directed at USB address 0 and endpoint 0 is detected, the endpoint 0 processing (502) decodes the packet, and performs the operation required by the packet. When the endpoint 0 processing (502) receives the "Set Address" request from the USB, the USB address of the system is set to the commanded address. From this point, the system responds only to USB packets addressed to the newly set address. When the endpoint 0 processing (502) detects the "Set Configuration" USB request, it enables the endpoint 1 processing (504) and the processes (506), (508), and (505) related to input data acquisition and translation.

The SOF/EOP processing (503) keeps track of the timing of SOF packets or EOP signals. If such communications are not received for a period of greater than 3 milliseconds, the suspend processing (507) is invoked, which puts the system in a low power mode. The system remains in a low power mode until the USB activity is again detected. At such a time, operation is resumed. Optionally, the input data acquisition (506) recognizes input signal activity and advises the suspend processing (507) to issue resume signaling to the USB.

The input data acquisition (506), when enabled, checks for any incoming data to be converted. When such data is received, it is stripped of any non-data bits and the data is placed in an input data buffer. The input data acquisition (506) invokes optional input data flow control (508) to signal the data source (4) (FIGS. 1 and 2) about the status of the current communication. Examples of such signals can be acknowledgement that data was received with or without error, more data can or cannot be accepted due to buffer loading or processing, or any other signals that are needed to maintain proper communications.

When the input data buffer is not empty, the main program (500) invokes the input data translation (505), which checks the data in the buffer for validity. If the data is determined to be valid, the input data translation (505) translates the data into the appropriate USB keyboard key code. The input data translation (505) also checks if the code needs another key on the computer keyboard to be held down simultaneously to be properly represented. If so, the bit in the modifier byte in the USB keyboard message indicating that the required modifier key is down is set. The input data translation (505) maintains translated codes in a keyboard data buffer. After translating the code, the input data translation (505) checks if the USB keyboard key code is already present in the buffer and if the modifier key codes match the modifier of the code being translated. If the modifier does not match the modifiers in the buffer or the key code is already present in the buffer, the input data translation (505) advises the endpoint 1 processing (504) that a buffer is ready for transmission to the USB. When an "IN" request directed at the address current in the system and endpoint 1 is detected, the endpoint 1 processing (504) sends to the USB the keyboard data buffer that is ready. If a keyboard data buffer is not ready, the endpoint 1 processing (504) returns a "NAK" to the USB.

When the input data buffer is empty, the main program (500) checks if the last keyboard data buffer has been sent to the USB. If it is determined the last keyboard data buffer has been sent and an empty keyboard data buffer has not been sent to the USB, the main program (500) prepares an empty keyboard data buffer and advises the endpoint 1 processing (504) that a buffer is ready for transmission to the USB. When an "IN" request directed at the address current in the system and endpoint 1 is detected, the endpoint 1 processing (504) sends to the USB the empty keyboard data buffer.

When the input data buffer is empty, and the main program (500) finds that the last keyboard data buffer and an empty keyboard data buffer have been sent to the USB, the Main program (500) waits for the input data buffer to become not empty.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described herein. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. Apparatus for converting protocol and code for use with a Human Interface Device (HID)-compliant keyboard device, comprising:

an Universal Serial Bus (USB) interface for receiving standard USB data from an USB host or hub and providing responses required by an USB Specification for said HID-compliant keyboard device;

a non-USB interface for receiving data coded in American Standard Character Interchange Interface (ASCII), Unicode or other non-ASCII format; and a convert for converting said data coded in ASCII, Unicode or other non-ASCII format into code an format in accordance with said USB Specification for said HID-compliant keyboard device, wherein said non-USB interface is operable to receive data coded in Unicode.

2. Apparatus of claim 1, further comprising interfaces for connecting standard USB devices.

3. Apparatus of claim 1, further comprising an ASCII translator for generating USB keyboard break (key up) codes after receipt of a character.

4. Apparatus for converting protocol and code for use with a Human Interface Device (HID)-compliant keyboard device, comprising:

an Universal Serial Bus (USB) interface for receiving standard USB data from an USB host or hub and providing responses required by an USB Specification for said HID-compliant keyboard device;

a non-USB interface for receiving data coded in Unicode; and a converter for converting said data coded in Unicode into code and format in accordance with said USB Specification for said HID-compliant keyboard device.

5. Apparatus of claim 4, further comprising interfaces for connecting Standard USB devices.

6. Apparatus of claim 5, further comprising an Unicode translator for generating USB keyboard break (key up) codes after receipt of a character.

7. Apparatus of claim 4, wherein said non-USB interface is operable to receive data coded in American Standard Character Interchange Interface (ASCII) or other non-Unicode format.

8. The method of converting protocol and code for use with a Human Interface Device (HID)-compliant keyboard device, comprising the steps of:

receiving standard data from an USB host or hub and providing responses required by an USB Specification for said HID-compliant keyboard device;

receiving data coded in Unicode; and converting said data coded in Unicode into code and format in accordance with said USB Specification for said HID-compliant keyboard device.

9. The method of claim 8, further comprising the step of connecting standard USB devices.

10. The method of claim 8, further comprising the step of receiving data coded in American Standard Character Interchange Interface (ASII) or other non-Unicode format.

11. The method of claim 8, further comprising the step of generating USB keyboard break (key up) codes after receipt of a character.

* * * * *